H. ROBINSON.
VEGETABLE PARING MACHINE.
APPLICATION FILED MAY 13, 1913.
1,087,554.
Patented Feb. 17, 1914.
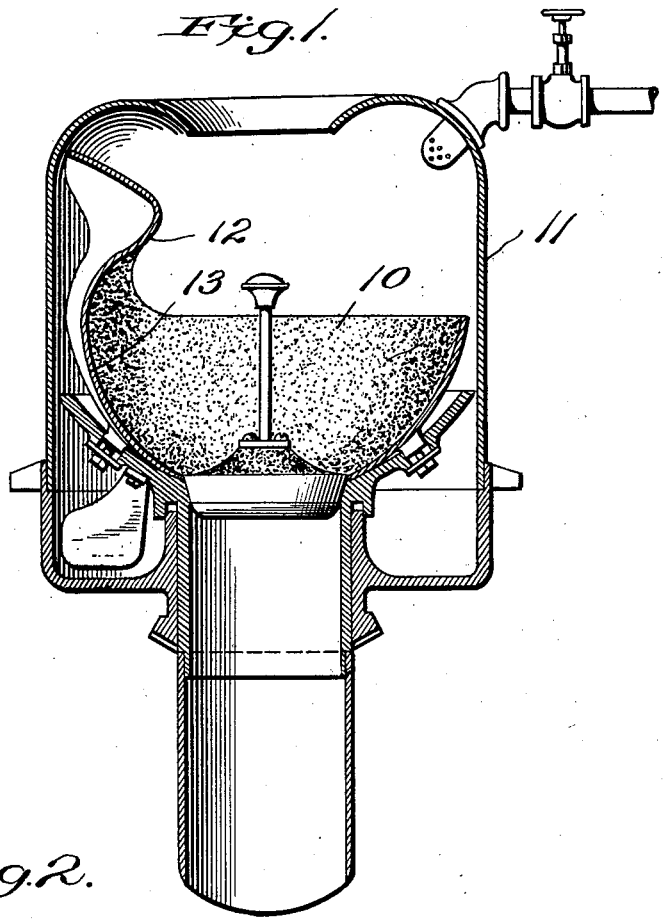
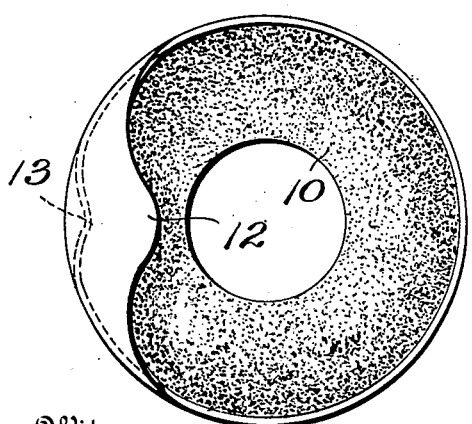
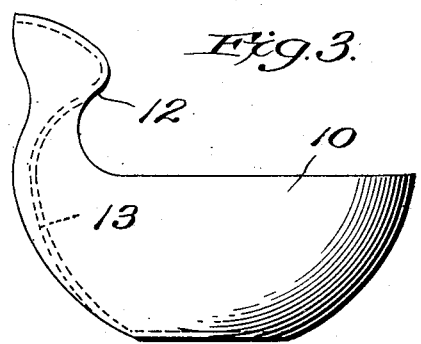
Henry Robinson, Inventor
By his Attorneys
Wilkinson, Giusta and MacKaye

UNITED STATES PATENT OFFICE.

HENRY ROBINSON, OF SOUTH ORANGE, NEW JERSEY.

VEGETABLE-PARING MACHINE.

1,087,554.  Specification of Letters Patent.  Patented Feb. 17, 1914.

Application filed May 13, 1913. Serial No. 767,442.

*To all whom it may concern:*

Be it known that I, HENRY ROBINSON, a citizen of the United States, residing at South Orange, in the State of New Jersey, have invented certain new and useful Improvements in Vegetable-Paring Machines; and I do hereby declare the following to be a full, clear, and exact description of the invention, such as will enable others skilled in the art to which it appertains to make and use the same.

In my Letters Patent No. 1031735 for vegetable paring machine, I have described a novel form of paring machine for treating vegetables in a mass, wherein an abradant container of bowl shape revolves as a whole, this container being shaped so as to tend to return toward the center the vegetables which are driven to the upper surface at the edge by centrifugal force. In some cases it becomes desirable to supplement this tendency for the purpose of better circulation within the mass, and in my said patent I have described a stationary device for this purpose attached to the means preferably employed in opening the exit at the bottom of the bowl.

My present invention relates to an improved form of bowl, so arranged that any degree of centripetal action may be secured, and this end is carried out by means of a movable diverter traveling with the container, and preferably forming a part thereof.

In the accompanying drawings my invention is illustrated in a preferred form.

Figure 1 shows my improved bowl in median vertical section, Fig. 2 is a plan view thereof and Fig. 3 is a side elevation thereof.

The revoluble bowl is shown at 10, suitably mounted within the sheet metal cover 11, as described in my aforesaid Letters Patent, and those parts of the entire machine with which my invention is not concerned are not illustrated.

My improvement consists in providing the upper edge of the revolving bowl with an overhanging extension 12, so curved as to afford a downwardly exerted reaction to those vegetables which are driven upward along the outer wall of the bowl. Of course, the invention would cover a duplication of such devices. The traveling diverter thus formed is preferably an inwardly curved extension of one of the "humps" or "waves" shown at 19 in my said patent drawings, and for this reason I have shown the same curved inward so as to present an external concavity 13 and a corresponding material convexity along a rising wave on the side of the container 10. As shown in the drawing, this feature forms an integral part of the bowl, but this is not essential.

Since the bowl always moves faster than the vegetables within it, the improved formation shown provides a curving surface of such a nature as to gradually scoop the rising potatoes or the like, and divert their motion toward the center of the machine. This aids in producing the necessary circulation within the mass whereby all parts of all of the vegetables are successively subjected to the abrasive action whereby the paring or peeling is carried out.

What I claim is—

1. In a vegetable peeler, a rotary bowl having at its upper edge an inwardly curved extension, substantially as described.

2. In a vegetable peeler, a rotary bowl having at its upper edge a curved extension overhanging said bowl so as to afford a downward reaction to vegetables rising against its inner surface, substantially as described.

3. In a vegetable peeler, a rotary bowl provided with an inwardly convex hump extending upward within its wall and curved inward at its upper portion so as to overhang said bowl.

In testimony whereof, I affix my signature, in presence of two witnesses.

HENRY ROBINSON.

Witnesses:
T. ROSE,
A. GOHDE.

---

Copies of this patent may be obtained for five cents each, by addressing the "Commissioner of Patents, Washington, D. C."